United States Patent [19]

Posso

[11] 4,451,020
[45] May 29, 1984

[54] PLATFORM FOR A CAMERA OR CINE CAMERA STAND

[75] Inventor: Patrick Posso, Lausanne, Switzerland

[73] Assignee: Gefitec S.A., Lausanne, Switzerland

[21] Appl. No.: 290,395

[22] Filed: Aug. 5, 1981

[30] Foreign Application Priority Data

Aug. 19, 1980 [FR] France ................................ 8018140

[51] Int. Cl.³ ............................................ F16M 11/12
[52] U.S. Cl. .................................... 248/183; 248/184; 354/293
[58] Field of Search ............... 248/183, 184, 185, 178; 352/243; 354/293, 81

[56] References Cited

U.S. PATENT DOCUMENTS

| | | | |
|---|---|---|---|
| 729,432 | 5/1903 | Sidway | 248/184 X |
| 2,226,827 | 12/1940 | Moore | 248/183 |
| 2,499,066 | 2/1950 | Jacobson | 248/183 |
| 2,514,313 | 7/1950 | Davidson et al. | 248/183 |
| 3,205,522 | 9/1965 | Then | 248/184 X |
| 4,247,069 | 1/1981 | Kurz | 248/185 |
| 4,326,688 | 4/1982 | Posso | 248/178 |

Primary Examiner—Ramon S. Britts
Assistant Examiner—Sarah A. Lechok
Attorney, Agent, or Firm—Shenier & O'Connor

[57] ABSTRACT

The invention relates to an improved platform for a camera or cine camera stand, wherein a dog gear wheel fast with the deck element cooperates with the corresponding gear wheel of the dog which is fast with a split sleeve which is mounted to slide on a shaft, fast with said deck element and free in the turret, is repelled, for mesh of the teeth of these gear wheels, by a spring abutting on a shouldered part of said shaft and is adapted to be clamped thereon by a control handle screwed in said split sleeve.

2 Claims, 4 Drawing Figures

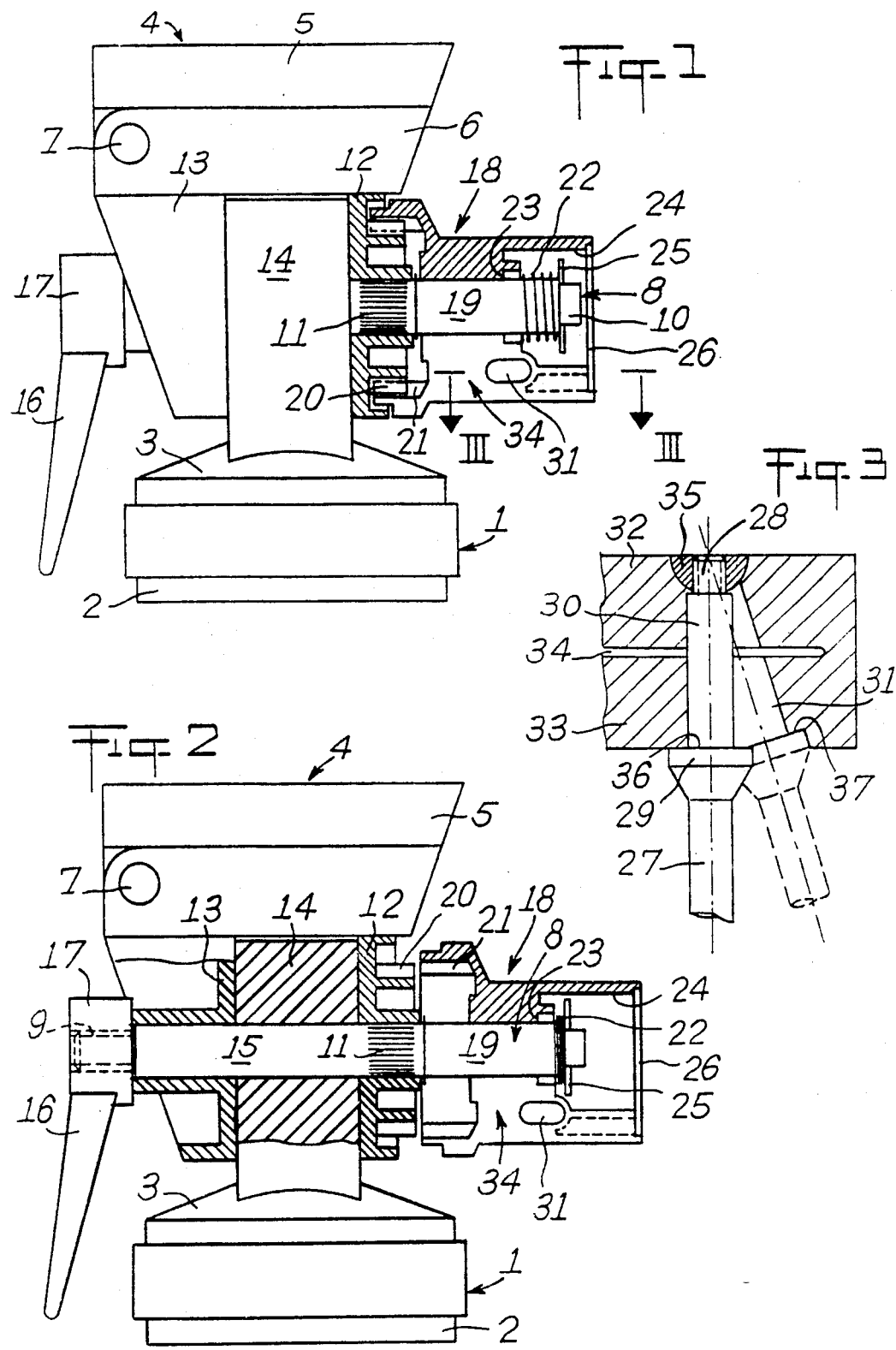

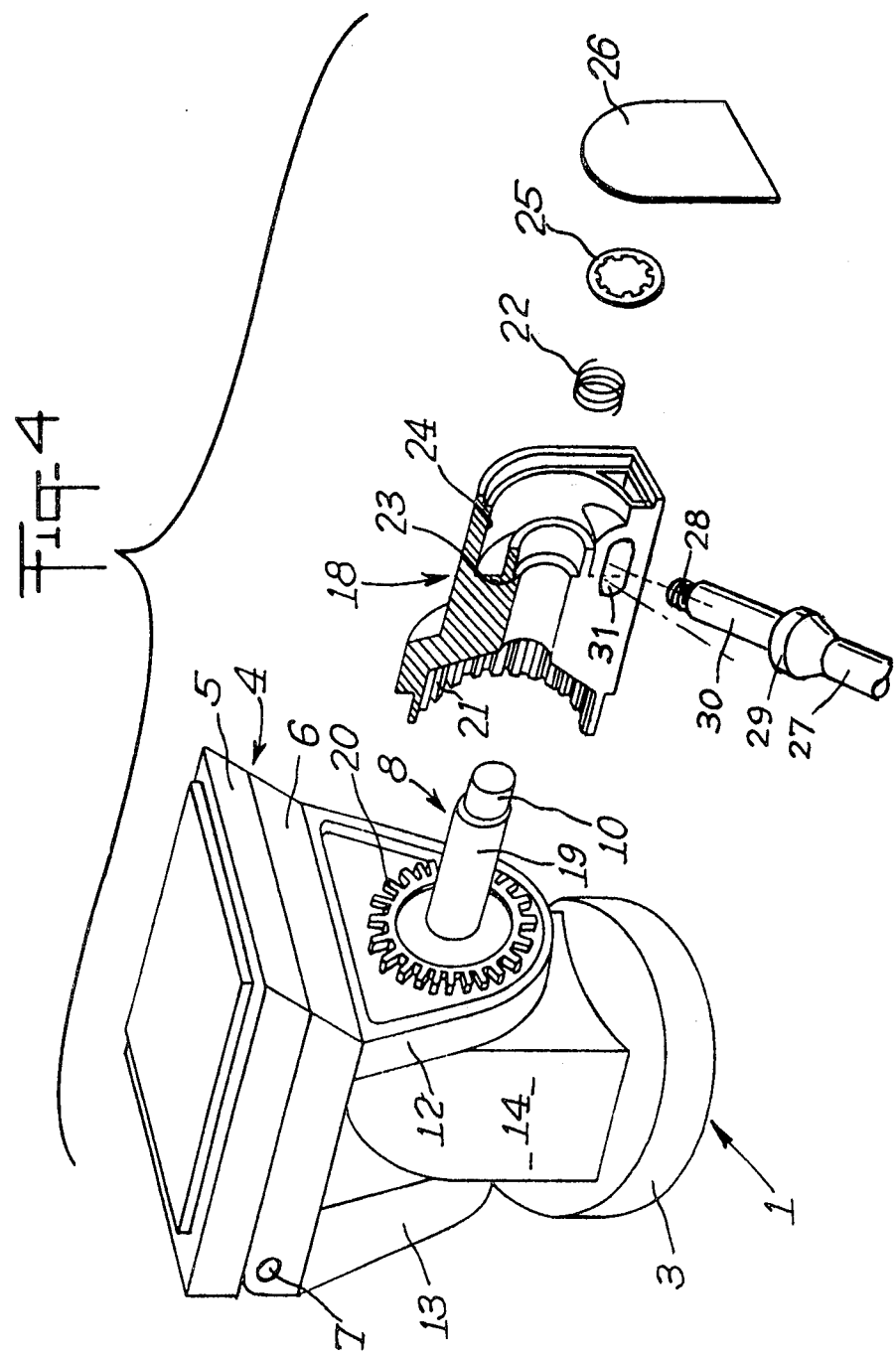

PLATFORM FOR A CAMERA OR CINE CAMERA STAND

The present invention relates to improvements in the rotating and inclinable platforms for camera or cine camera stands.

A known platform of this type comprises a turret mounted to rotate about a vertical axis with respect to a foldable support and supporting the lower plate of a deck element of which the upper plate is provided for supporting and fixing the filming apparatus, these two plates being hinged on each other by a horizontal shaft. The lower plate of the deck element is connected to the mobile table of the turret by a horizontal shaft, at right angles to the preceding shaft, which is coupled to a projecting element of said plate and rotatably traverses a corresponding projecting element of said table. A split sleeve fitted on a projecting end of the shaft is clamped thereon in the chosen angular position by means of a shouldered and screwed control handle. Furthermore, the opposite free end of the shaft is threaded and cooperates with a tapped locking lever which enables the mobility of the deck element relative to the table of the turret to be regulated, and even blocked.

When the control handle is fast with the shaft, it enables the platform to be manoeuvred to incline the deck element and/or orient the turret in any direction with a view to taking a still photograph after blocking the above-mentioned lever and the others, not described, including that of said turret, or to making a motion picture. Moreover, as this handle is adjustable, it is very easy to position it in the most convenient position for the user to film and to adapt this positioning to a left-handed or right-handed person.

However, this device composed of a split sleeve has the drawback of being able to work loose, with the result that the deck element supporting the filming apparatus may no longer be controlled by the handle; the apparatus may then tip over and be damaged or, if the loosening is moderate, it will not follow the trajectory of sight controlled by the operator's hand.

It is an object of the present invention to overcome this drawback whilst maintaining the above-mentioned advantages of adjustment and adaptation of the handle and, to this end, a dog gear wheel fast with the projecting element of the deck element cooperates with the corresponding gear wheel of the dog which is fast with the split sleeve, which is mounted to slide on the shaft and repelled, for the teeth of these gear wheels to mesh, by an elastic member abutting on a shouldered part of said shaft.

In addition, to facilitate the manoeuvre of the deck element for bidirectional orientation, whilst enabling the platform to be stowed away with minimum bulk and always ensuring a positive control of said deck element, i.e. without any risk of untimely disconnection, the control handle passes through the two sides of the split sleeve and cooperates, by its threaded free end, with a cylindrical nut mounted to pivot in one of the sides and, by a shouldered flange, with either one of two bearing seats formed as a dihedron on the other side of the sleeve to define two particular angular positions of this handle, which then traverses a conical oblong slot made in said two sides.

The invention will be more readily understood on reading the following description with reference to the accompanying drawings, in which:

FIG. 1 is a view in elevation, partly in section, showing the improved platform according to the invention, in the position of positive coupling.

FIG. 2 is a similar view to FIG. 1, of which the part in section is more extensive, this view illustrating the position of disconnection.

FIG. 3 is a section taken, to a larger scale, along line III—III of FIG. 1 to show the particular assembly of the control handle.

FIG. 4 is an exploded view in perspective, with parts torn away, showing the platform improved according to the invention.

Referring now to the drawings, the platform comprises a turret 1 of which the fixed seat 2 is provided with a foldable support (not shown) and supports a table 3 adapted to rotate about a vertical axis. The platform also comprises a deck element 4 constituted by two plates 5 and 6 hinged on each other by means of a horizontal shaft 7. The upper plate 5 is adapted for assembly of a filming apparatus and allows lateral inclination thereof (with respect to the position illustrated in the drawing). The lower plate 6 is supported by the table 3 but so as to be pivotable in the anteroposterior direction about a horizontal axis.

This latter horizontal axis is that of a shaft 8 which presents, between its threaded end 9 and its shouldered end 10, a slightly projecting splined portion 11 for connection. The lower plate 6 is fast with a clevis whose wings 12 and 13 are disposed on either side of a lug 14 surmounting the table 3. The splined portion 11 is force-fitted in the wing 12, whilst the remaining part 15 of the shaft is free to rotate in the lug 14. Thus, said shaft 8 pivots, about its horizontal axis, fast with the deck element, but this pivoting may be made difficult, and even blocked, due to a lever 16 whose tapped head 17 is screwed on the threaded end 9 of the shaft 8, with possible interposition of elastically deformable washers and/or friction washers; thus, by screwing the lever more or less, the mobility of the deck element is regulated and it may even be blocked in any position.

According to the invention, a split sleeve 18 is mounted to rotate and slide on the projecting part 19 of the shaft. The sleeve is adapted to be coupled to the deck element by a dog element due to which any angular position of coupling may be obtained; an externally toothed wheel 20 of the dog, integral therewith, projects from the visible side face of the wing 12 of the deck element; an internally toothed wheel 21 of the dog, corresponding to the preceding one, is integral with and projects from a facial flange of the sleeve. Furthermore, the teeth 20 and 21 are maintained elastically in mesh by means of a spring 22 fitted on the shaft 8 and interposed between the bottom 23 of a chamber 24 made at the end of the sleeve, on the one hand, and a starred washer 25 gripped on the shouldered end 10 of the shaft. The chamber 24 in which the elastic system is housed is closed by a cover 26.

In the position illustrated in FIG. 1, the spring 22 is slack and ensures engagement of the dog by mesh of its teeth 20 and 21; on the contrary, in the position shown in FIG. 2, the spring 22 is compressed and said teeth being separated from each other, are disconnected.

A control handle 27 is also provided, not only for clamping the sleeve 18 on the shaft in the position of mesh of the dog, but also to be able to manoeuvre the filming apparatus by pivoting the deck element both about the vertical axis of the turret and the horizontal axis of the shaft. The unclamping of the sleeve accompanied by the disconnection of the dog enables the angular position of the handle suitable for the manoeuvre envisaged to be chosen, whether the operator is right-handed or left-handed.

The handle 27 is provided with a threaded end 28 and a shouldered flange 29, between which extends a rod 30 adapted to pass through a conical oblong slot 31 made in the two sides 32 and 33 of the sleeve 18 on either side of the slot 34 which separates them. The threaded end 28 cooperates with a cylindrical nut 35 mounted to pivot in the side 32 in the zone of convergence of the slot 31. The flange 29 abuts selectively against either one of two bearing seats 36 and 37 extending as a dihedron and defining two particular angular positions of the handle. In one position, corresponding to seat 36 which is substantially parallel to the axes of rotation, the handle is folded down against the folded support and occupies minimum space. In the other position corresponding to the sloping seat 37, the handle is inclined laterally and is in the best orientation for manoeuvring.

The invention is not limited to the embodiment which has been shown and described in detail, as various modifications may be made thereto without departing from the scope thereof.

What is claimed is:

1. An improved platform for a camera comprising a turret having a table mounted for rotation around a vertical axis, a deck element, a first projection on said table, a shaft supported on said first projection for rotation around a horizontal axis, a second projection on said deck element secured to said shaft for rotation therewith, whereby said deck element is supported on said table, a split sleeve carried by said shaft for rotary and axial movement, respective interengageable toothed elements carried respectively by said second projection and by said split sleeve for rotation therewith, said split sleeve being axially movable between a first position at which said toothed elements are engaged to cause said sleeve and said shaft to rotate as a unit and a second position at which said toothed elements are out of engagement to permit said sleeve to rotate on said shaft, resilient means urging said sleeve to said first position, a control handle and means for screwing said handle onto said sleeve to clamp said sleeve to said shaft.

2. An improved platform as in claim 1 in which said split sleeve has two sides separated by a slot, a tapering oblong slot extending through said sides, a generally cylindrical recess at one end of said tapering slot, and a pair of relatively angularly disposed bearing seats and in which said means for screwing said handle on said sleeve comprises a cylindrical nut in said cylindrical recess, a threaded end on said control handle adapted to be screwed into said nut and a flange on said handle selectively engaged with said seats.

* * * * *